United States Patent [19]

Martins

[11] 4,340,327
[45] Jul. 20, 1982

[54] TOOL SUPPORT AND DRILLING TOOL

[75] Inventor: Jose Martins, New Bedford, Mass.

[73] Assignee: Gulf & Western Manufacturing Co., Southfield, Mich.

[21] Appl. No.: 165,864

[22] Filed: Jul. 1, 1980

[51] Int. Cl.³ .................... B23B 51/06; B23B 51/08
[52] U.S. Cl. .............................. 408/59; 408/188; 408/225; 408/233; 408/713
[58] Field of Search .............. 408/59, 188, 196, 201, 408/224, 225, 229, 233, 705, 713, 211; 144/219; 145/116 R

[56] References Cited

U.S. PATENT DOCUMENTS

| | | | |
|---|---|---|---|
| Re. 28,900 | 7/1976 | Byers et al. | 408/201 |
| 1,467,395 | 11/1927 | Costello | 408/224 |
| 1,499,584 | 7/1924 | Litchfield | 408/211 |
| 1,561,463 | 11/1925 | De Rochemont | 408/201 |
| 1,940,220 | 12/1933 | McGrath | 408/59 |
| 2,294,969 | 9/1942 | Engvall et al. | 408/224 |
| 2,858,109 | 10/1958 | Tengberg . | |
| 3,376,763 | 4/1968 | Welles | 408/713 X |
| 3,575,520 | 4/1971 | Halpern . | |
| 3,712,753 | 1/1973 | Manzi | 408/224 |
| 3,737,245 | 6/1973 | Mater | 408/225 |
| 4,129,401 | 12/1978 | Berthier | 408/59 |
| 4,248,555 | 2/1981 | Satou | 408/225 |
| 4,293,251 | 10/1981 | Anderson | 408/59 |

Primary Examiner—Z. R. Bilinsky

[57] ABSTRACT

A tool support is provided for removably supporting a twist drill of high speed steel and a pair of indexable cutter blades of tungsten carbide. The cutter blades are triangular and provide three cutting edges about the periphery thereof, and the cutter blades are removably mounted on the tool support to enable selective indexing of the cutting edges to a cutting position. The cutting edge to be used is axially and radially stabilized in the cutting position by engaging edge and bottom portions of the blade in a pocket provided on the tool support. The tool support includes a channel adjacent each of the cutter blades defined by walls extending axially of the tool support in planes parallel to the tool axis and perpendicular to one another to optimize the available area for chip removal, and the entrance ends of the channels are provided with relief surfaces to promote the feeding of chips into the channels. A bore is provided in the mounting end of the tool support to receive lubricant, and a pair of lubricant passages extend through the tool support from the bore and open through the outer end face of the body portion between the channels therein.

9 Claims, 11 Drawing Figures

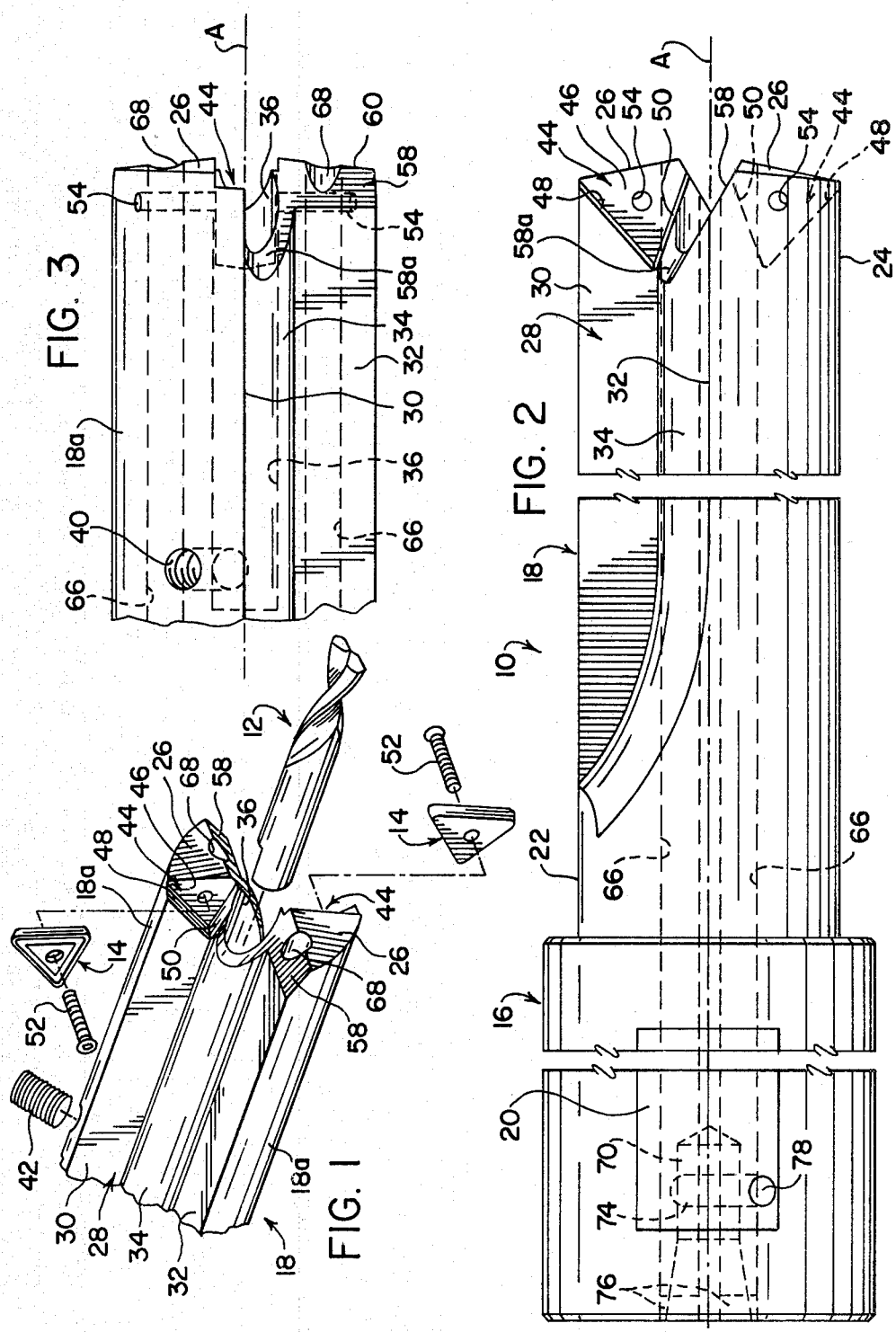

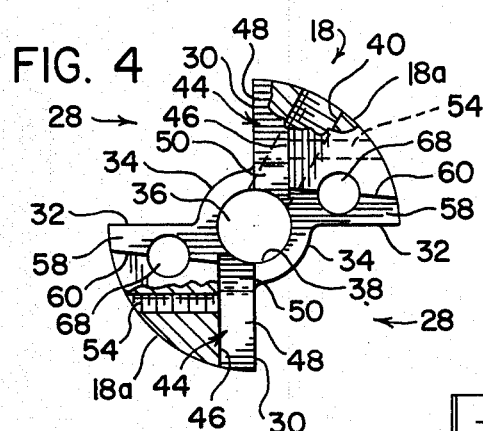
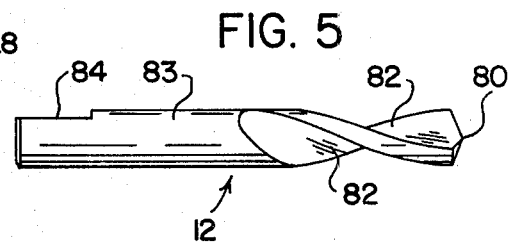
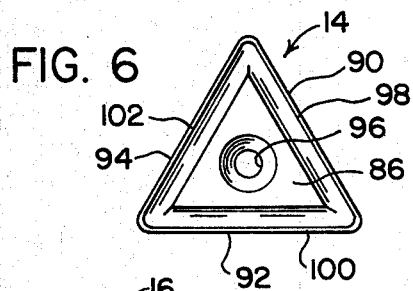
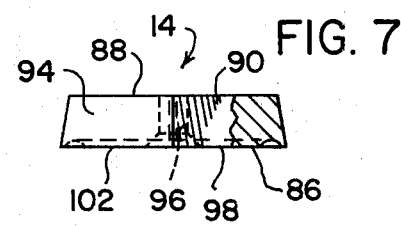
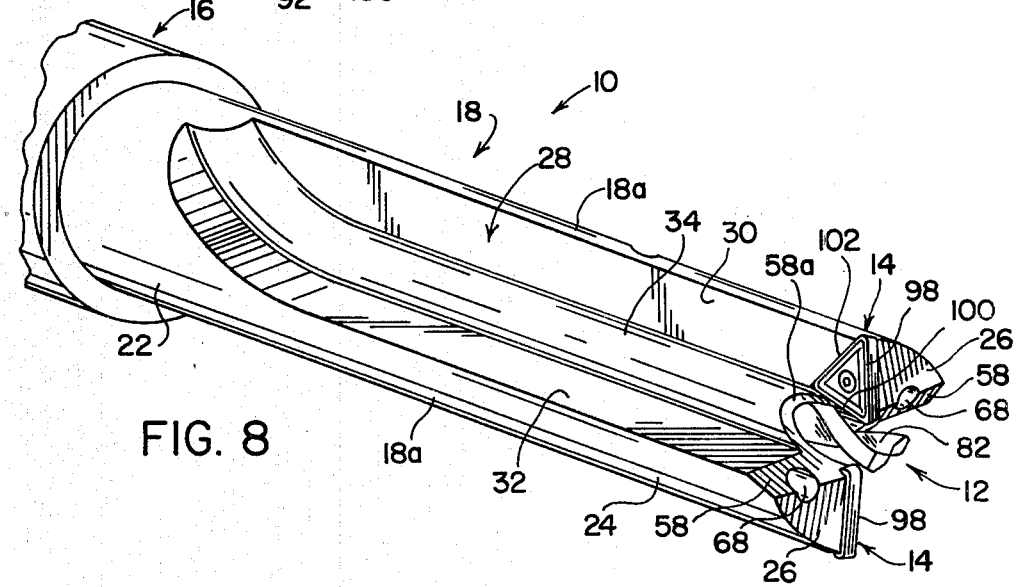

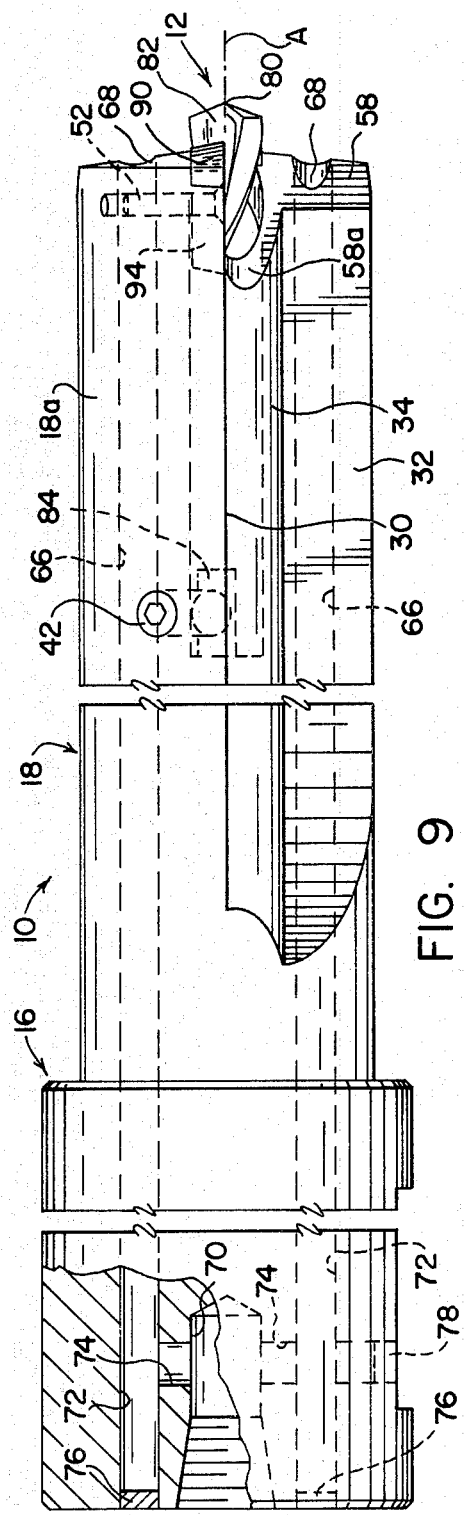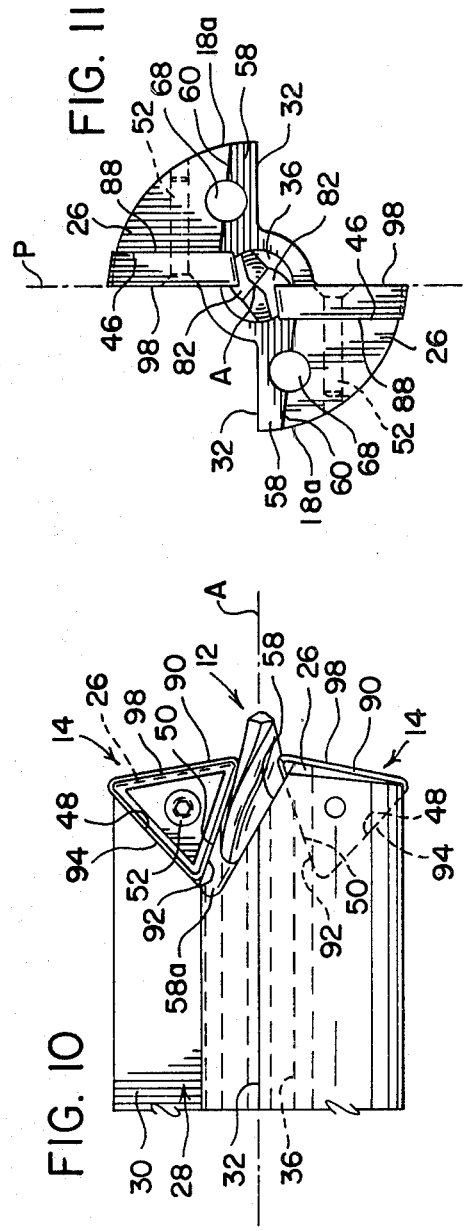

TOOL SUPPORT AND DRILLING TOOL

BACKGROUND OF THE INVENTION

The present invention relates to the art of tools and tool supports and, more particularly, to a support for drilling components and drilling tool defined thereby.

It is known in the art of drilling tools to combine a center drill with cutter blades providing radially extending cutting edges spaced axially behind the tip of the center drill. Such a combination is particularly useful in connection with the drilling and boring of metals by providing for the center drill to be of high speed steel and the cutter blades to be of a hard metal alloy such as tungsten carbide. In this respect, the high speed steel drill enables positive penetration at the center of the bore, and guidance during the drilling operation, and location of the carbide cutting edges axially outwardly of the axis of the drill optimizes the cutting capacity thereof. Such a combination drilling tool and the advantages thereof is disclosed in U.S. Pat. No. 2,294,969 to Engvall et al. A drill and the support for the component parts thereof according to the present invention finds particular utility in connection with the combination of a high speed steel twist drill and carbide cutting edges and, accordingly, will be described in detail herein in connection therewith. At the same time, however, it will be appreciated that the present invention has broader application and is not limited to such combination of cutting materials. It is also known in the art of drilling and drilling tools to provide a drilling tool support on which a center drill and cutter blades having radially extending cutting edges are removably mounted to facilitate replacement or resharpening of the cutting edges. Examples of such drilling tool supports are disclosed in U.S. Pat. Nos. 1,499,584 to Litchfield; and, 3,712,753 to Manzi.

A number of disadvantages are attendant to the construction and use of such combination drills heretofore provided, and tool supports heretofore provided for removably supporting center drill and cutting blade components. In this respect, for example, considerable force is imposed on the radially extending cutter blades in a direction transverse to the tool axis during a drilling operation, whereby the rate of penetration and thus the drilling speed are limited, in part, by the structural integrity of the arrangement defining the support for the radially extending cutter blades. Heretofore, such support has not enabled optimizing the cutting speed with regard to the cutting characteristics of the materials of the drill parts, or has required structurally complex support arrangements requiring special machining operations which render the drill or tool support unreasonably expensive. Another factor affecting cutting speed is the ability to dissipate heat generated during the cutting operation which, in part, is related to the displacement of chips along the drilling tool. In this respect, the primary support portions of certain combination type drills heretofore provided are defined by structural modifications of standard twist drills having spiral lands extending therealong which are of a diameter equal to that of the hole being drilled or bored. Accordingly, chip removal is achieved by movement of chips along the spiral flutes between the lands. Such a spiral flute, together with the surface of a hole being drilled, provides a chip removal path which is of small cross-section and is longer than the axial distance between the cutting end of the drill and the point of chip discharge. Therefore, the chips, which are hot, are compelled to move along a long spiral path which is small in cross-section, whereby heat dissipation is at a rate much lower than desired. Heating is of course at a maximum at the point of cutting engagement between the drilling tool and the material being bored, and such heating as is well known affects the life of the cutting edges of the drilling tool components. Accordingly, it will be appreciated that the life of the cutting edges is further affected by trapping heat at the cutting end of the drilling tool which, in effect, is the result of a long chip removal path.

Efforts to minimize or overcome the disadvantages of such high temperatures at the cutting end of the drilling tool by the occasional introduction of a cooling lubricant either requires the withdrawing of the drill for introduction of the lubricant into the hole being drilled, or the introduction of lubricant into the flute area of the drill and the periphery of the hole being drilled during the drilling operation. The former is undesirable from the standpoint of operating time lost in order to achieve lubrication, and the latter is undesirable in that penetration of the lubricant to the cutting end of the drilling tool is minimal in that the lubricant is absorbed by the chips in the flutes and is influenced to flow outwardly of the bore along the flutes by the configuration thereof before reaching the cutting end of the drilling tool.

Further in connection with such combination drilling tools, considerable time can be lost in connection with the use thereof during a given drilling operation by having to remove the drill, resharpen or replace blade portions thereof, and then remount the drill and continue the operation. Moreover, considerable cost can be incurred in connection with removable and replaceable blade components having but a single useful cutting edge which can be damaged during use to the extent that resharpening of the cutting edge is not possible. This is especially true with blades of hard metal alloys such as tungsten carbide which is extremely brittle. Accordingly, when the one cutting edge becomes so damaged, the cutter component must be replaced or, if the blade is permanently secured to the tool support, the entire drill must be replaced. It will be appreciated that all of these characteristics increase tool costs and time required to achieve a given drilling operation and, thus increase production costs with regard to the drilling operation being preformed.

SUMMARY OF THE INVENTION

In accordance with the present invention, an improved tool support for multiple drilling and boring components, and an improved drilling tool, are provided by which the advantages of a combined center drill and cutter blade tool are retained while the disadvantages of such tools heretofore provided are minimized or overcome. More particularly in this respect, the tool support is an elongated member having diametrically opposed linear channels extending axially therealong. The channels provide straight chip discharge paths of optimum cross-sectional area, thus promoting the dissipation of heat by facilitating chip displacement and the engress of ambient air toward the working end of the drilling tool. Preferably, the entrance ends of the channels are provided with relief surfaces inclined with respect to the axis of the tool support to promote movement of chips into the channels during a drilling operation. Further, the tool support is provided with an axial passageway at the working end thereof which removably supports a twist drill, and each of the channels supports a cutter blade having a cutting edge extending radially outwardly from the twist drill. The cutter blades are removably mounted on the tool support in facial engagement with a support surface in the corresponding channel, with the cutting edge closely adjacent the end face of the tool support, thus to optimize structural integrity with regard to supporting the cutting blade against forces imposed thereon during a drilling operation. The mounting arrangement is structurally simple and provides for accurately positioning and stabilizing the cutting edge with respect to the axis of the tool and the center drill. Preferably, the tool support is provided with lubricant passages extending internally therethrough and opening through the end face, whereby lubricant can be delivered directly to the working area without removing the drilling tool from the hole being drilled or bored.

In accordance with a preferred drilling tool according to the present invention, the cutter blades providing the radially extending cutting edges have a plurality of adjacent cutting edges adapted to be indexed individually and selectively into the cutting position thereof. Accordingly, damage to one edge of a cutter blade does not require replacement of the blade but rather only indexing of another cutting edge thereof into the cutting position. Further in accordance with the preferred drilling tool, the twist drill is a standard high speed steel drill bit having helical flutes, and the cutter blades are of a hard metal alloy such as tungsten carbide and are positioned by interengagement with the tool support for the cutting edge to extend radially into a corresponding flute of the twist drill so as to optimize protection of the radially inner ends of the blades which are the weakest with respect to the radial disposition of the cutting edges. This desired positional relationship between the radially inner ends of the cutter blades and the twist drill is advantageously achieved without a special construction for the twist drill, thus promoting economy with regard to manufacture of the tool and replacement of the center drill. Still further, the cutter blades are preferably interengaged with shoulders of a recess provided in the walls of the channels of the cutter support member to achieve positioning of the cutting edge being used and stability of the latter edge in the cutting position thereof. The recess, in addition to providing the desired positioning and support of the cutter blade, provides a structurally simple mounting and support arrangement while maintaining an optimum cross-sectional area at the entrance ends of the channels for the reception of chips thereinto.

It is accordingly an outstanding object of the present invention to provide an improved tool support for removably supporting a center drill and a pair of cutter blades providing radially outwardly extending cutting edges.

Another object is the provision of a tool support of the foregoing character providing improved structural integrity with regard to the support of cutter blades mounted thereon.

Yet another object is the provision of a tool support of the foregoing character which optimizes chip removal and heat dissipation from the working area of a drilling tool defined by a center drill and cutter blades mounted thereon.

A further object is the provision of an improved tool support of the foregoing character which is structurally simple with regard to the arrangement for mounting, supporting and positioning cutter blades thereon.

Still another object is the provision of a tool support of the foregoing character which provides for the delivery of a cooling lubricant therethrough directly to the working area of a drilling tool defined by a center drill and cutter blades mounted thereon.

Still another object of the present invention is the provision of an improved drilling tool comprising a support member removably supporting a center drill of high speed steel and a pair of cutter blades of hard metal alloy providing cutting edges extending radially outwardly from the center drill.

A further object is the provision of a cutting tool of the foregoing character in which each of the cutting blades has a plurality of separate cutting edges selectively indexable to a cutting position and interengaged with the support member to provide structural integrity with regard to support of the cutter blades and proper positioning of the selected cutting edge.

Yet a further object is the provision of a tool of the foregoing character which minimizes down time or lost operating time in connection with the use thereof for a given drilling operation.

Yet another object is the provision of a drilling tool of the foregoing character which is structurally simple and economical to produce and use and is highly efficient in operation.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which:

FIG. 1 is an exploded perspective view of a portion of a support member according to the present invention and a center drill and cutter blades mountable thereon;

FIG. 2 is a side elevation view of the support member;

FIG. 3 is a plan view of a portion of the support member shown in FIG. 2;

FIG. 4 is an end view, partially in section, of the support member looking from right to left in FIG. 2;

FIG. 5 illustrates a twist drill bit adapted to be removably mounted on the support member;

FIG. 6 is an elevation view of a cutter blade adapted to be removably mounted on the support member;

FIG. 7 is a top view, partially in section, of the cutter blade as seen in FIG. 6;

FIG. 8 is a perspective view of a portion of the support member, similar to FIG. 1, and showing the twist drill and cutter blades mounted thereon to provide a drilling tool;

FIG. 9 is a top view of the drilling tool;

FIG. 10 is a side elevation view of a portion of the drilling tool; and,

FIG. 11 is an end view of the drilling tool.

DESCRIPTION OF PREFERRED EMBODIMENTS

Referring now in greater detail to the drawings wherein the showings are for the purpose of illustrating preferred embodiments of the invention only, and not for the purpose of limiting the invention, FIGS. 1–4 of the drawing illustrate a tool support 10 which is adapted, as described more fully hereinafter, to removably support a center drill 12 and a pair of cutter blades 14. Tool support 10 has an axis A and includes coaxial mounting and body portions 16 and 18, respectively. Mounting portion 16 is cylindrical in cross-section and is provided with a flat 20 to facilitate securing the cutting tool in a machine tool, and body portion 18 extends forwardly from mounting portion 16 and has an inner end 22 adjacent mounting portion 16 and an outer end 24 which includes outer end faces 26. Inner end 22 is cylindrical in cross-section and of smaller larger or same diameter as mounting portion 16 and, for the purpose set forth hereinafter, body portion 18 has axially extending outer surface portions 18a between inner end 22 and outer end 24 which have a circular contour and a radius corresponding to that of inner end 22.

Body portion 18 includes a pair of diametrically opposed channels 28 extending axially inwardly from end faces 26 parallel to axis A. Each channel 28 includes a corresponding first planar wall 30 and a corresponding second planar wall 32, which walls 30 and 32 of each channel extend radially of axis A and axially of the body portion from outer end 24 toward inner end 22 in planes parallel to axis A and perpendicular to one another and which planes, preferably, intersect axis A. Each wall 30 has a radially outer end intersecting outer surface 18a and a radially inner end, not designated numerically, and each wall 32 similarly has corresponding radially outer and inner ends. Each channel 28 further includes a third wall 34, preferably of circular contour, and extending circumferentially between the radially inner ends of the corresponding channel walls 30 and 32. Channels 28 provide linear chip removal paths along the tool support and, adjacent inner end 22 of body portion 18, walls 32 and 34 curve radially outwardly with respect to axis A to provide for the channels 28 to merge with the outer surface of the body portion at inner end 22 thereof.

Outer end 24 of body portion 18 is provided with an axially inwardly extending passageway 36 which is cylindrical in cross-section and has a peripheral wall 38 spaced radially inwardly of channel walls 34. Passageway 36 is adapted to removably support drill bit 12 and, in this respect, body portion 18 is provided with a threaded passageway 40 extending radially thereinto and opening into the inner end of passageway 36 to receive a set screw 42 for engaging the inner end of drill bit 12 in the passageway. Wall 30 of each channel is provided adjacent the corresponding end face 26 with an axially extending recess 44 adapted to receive and position a corresponding one of the cutter blades 14 relative to end face 26 and axis A, as set forth more fully hereinafter. In the preferred embodiment, each of the recesses 44 includes a planar surface 46 parallel to the plane of the corresponding wall 30 and intersecting the corresponding end face 26, and angularly related walls providing shoulders 48 and 50 extending from surface 46 toward the corresponding channel 28. Preferably, surface 46 is offset from the plane of the corresponding wall 30 a distance equal to the thickness of cutter blade 14 and shoulders 48 and 50 interengage with peripheral side edges of the cutter blade to position a cutting edge thereof axially and radially with respect to the corresponding end face 26 and axis A. As described more fully hereinafter, the cutter blades are triangular and, accordingly, shoulders 48 and 50 are angularly related to one another and to axis A to achieve the desired positioning of a cutting edge of the blade when the blade is mounted on the tool support. More particularly in connection with such a triangular cutter blade, shoulder 48 extends radially outwardly and axially forwardly along wall 30 from a point adjacent the radially inner end thereof, and shoulder 50 extends radially inwardly and axially forwardly from the inner end of shoulder 48. Preferably, each cutter blade 14 is mounted on tool support 10 by means of a machine screw 52 extending through an opening in the cutter blade and into a threaded hole 54 in the portion of outer end 24 of the tool support therebehind, as will be appreciated from FIG. 1. With further regard to the structural integrity of the support arrangement for the cutter blades, as best seen in FIG. 4, the quadrant-like configuration of channels 28 provide a similar quadrant-like solid portion between the first wall 30 of each channel and the second wall 32 of the other channel. Such solid quandrant-like structure is optimized with respect to the cross-sectional area of the material of the tool support available by providing for the outer surfaces 18a between walls 30 of each channel and walls 32 of the other channel to be of circular contour having a radius corresponding to that of cylindrical inner end 22 of the body portion.

As mentioned hereinabove, the cross-sectional configuration of channels 28 optimizes chip removal and, in accordance with another aspect of the tool support, the entrance end of each channel includes a relief surface 58 which is inclined with respect to axis A and intersects the corresponding outer end face 26 along a line 60 extending laterally with respect to axis A and which, if extended, would be tangent to or closely adjacent wall 38 of passageway 36. Each relief surface 58 extends axially inwardly of the body portion of the tool support in spaced relationship with respect to wall 50 of the corresponding recess 44. Each surface 58 also extends through the material of the body portion between channel wall 34 and drill bit passageway 36 and has an inner end 58a which curves back toward recess wall 50 and merges with the radially inner edge thereof.

Tool support 10 is provided with a pair of diametrically opposed lubricant passageways 66 extending through body portion 18 and having outer ends 68 each opening through one of the outer end faces 26. Preferably, outer ends 68 are each bisected by edge 60 between the corresponding end face 26 and relief surface 58. This promotes flow of a portion of the lubricant circumferentially of the channels and axially inwardly along relief surface 58, which lubricant flow in turn promotes chip movement into the corresponding channel of the tool support. Mounting portion 16 of the tool support is provided with an axially inwardly extending bore 70 adapted to receive lubricant through a feed line associated with the machine tool. Lubricant passageways 66 have inner ends 72 in mounting portion 16 and, as best seen in FIG. 9, inner ends 72 are in fluid flow communication with bore 70 through radially extending entrance passages 74 between ends 72 and bore 70. It will be appreciated that the latter relationship is provided by drilling lubricant passageways 66 axially through the mounting portion from the inner end thereof and then plugging the passageways at the latter end of the mounting portion with plugs 76, and drilling transversely through the mounting portion to provide an opening intersecting passageways 66 and bore 70 and the plugging the outer end of the transverse opening with a plug 78.

In a preferred drilling tool made in accordance with the present invention, center drill 12 is a twist drill of high speed steel and cutter blades 14 are of a hard metal alloy such as tungsten carbide. Twist drill 12, as will be seen from FIG. 5, is a standard drill bit having an outer tip or point 80 and diametrically opposed helical flutes 82 extending inwardly therefrom. Preferably, the inner or shank end 83 of the drill bit is provided with a flat 84 adapted to be engaged by set screw 42 when the drill bit is mounted in tool support 10 for the drill bit to be interengaged with the tool support against rotation relative thereto and unintentional removal therefrom. As will be appreciated from FIGS. 6 and 7 of the drawing, each of the cutter blades 14 is preferably in the form of a equilateral triangle having front and back sides 86 and 88, respectively, and side edges 90, 92 and 94 between sides 86 and 88 and defining the legs of the triangle. An opening 96 is provided centrally of the cutter blade for receiving machine screw 52 by which the blade is mounted in recess 44 of tool support 10. Front side 86 of the cutter blade is inwardly recessed adjacent and about the periphery thereof to provide three linear coplanar cutting edges 98, 100 and 102 symmetrical with respect to the axis of opening 96, and side edges 90, 92 and 94 of the cutter blades converge with respect to one another in the direction from front side 86 toward back side 88 to provide a relief clearance for the corresponding cutting edge.

When twist drill 12 and cutter blades 14 are mounted on tool support 10, as seen in FIGS. 8-11 of the drawing, and as will be further appreciated from FIG. 1, sides 88 of the cutter blades facially engage surfaces 46 of recesses 44 and cutting edges 98, 100 and 102 circumferentially face in the direction of rotation of the drilling tool, which is counterclockwise in FIG. 11. Further, the plane of cutting edges 98, 100 and 102 is planar with the corresponding channel wall 30, thus to optimize the area at the entrance ends of the channels for the flow of chips thereinto. Moreover, it will be appreciated that the coplanar relationship between the cutting edges and channel walls also provides for the active cutting edges of the two cutter blades to be coplanar and in a common plane P passing through axis A. Any one of the cutting edges of the cutter blades can be selectively chosen as the active cutting edge to be used at any given time and, as illustrated in FIGS. 8-11, for example, cutter blades 14 are mounted on the tool support for cutting edges 98 to be the operative cutting edges. Proper positioning of cutting edge 98 relative to axis A and stability of the cutting edge in the cutting position is advantageously provided by interengagement of side edges 92 and 94 of the cutter blade with shoulders 50 and 48 of recess 44, respectively. Preferably, to optimize positional stability, shoulders 50 and 48 are inclined relative to surface 46 of recess 44 so as to facially engage side edges 92 and 94 of the cutter blade.

As will be appreciated from FIGS. 8-11, such positioning of cutting edge 98 provides for the latter to be inclined at a desired angle with respect to axis A and to be closely adjacent the edge of the corresponding outer end face 26 of the body portion of the tool support. Accordingly, it will be appreciated that the facial engagement of side 88 of the cutter blade with surface 46 of recess 44, and engagement of shoulders 50 and 48 with edges 92 and 94 between sides 86 and 88 of the cutter blade, respectively, optimize circumferential support of the cutter blade, and axial and radial support and positional stability thereof with respect to the circumferential and axial forces imposed thereon during a drilling operation. Furthermore, the diametrically opposed flutes 82 of twist drill 12 advantageously enable positioning of the radially inner ends of cutting edges 98 inwardly of the outer periphery of the drill bit, thus to protect the latter ends of cutting edge 98 from cutting forces during a drilling operation. When it becomes necessary or desirable to change a cutting edge of one or both of the cutter blades, such is readily achieved by removing machine screw 52 and indexing the cutter blade to position another one of the cutting edges in the operative position. Preferably, a ratio of about 4:1 is maintained with respect to the outer diameter of the drilling tool as defined by the radially outer ends of the cutting edges being used and the diameter of the twist drill. Thus, for example, if a one quarter inch twist drill is used the outer diameter as defined by the cutting edges of the cutter blades would be one inch.

While considerable emphasis has been placed herein on the preferred structure of the tool support and a drilling tool provided by the mounting of a center drill and cutter blades thereon, it will be appreciated that modifications of the preferred structures will be obvious and can be made without departing from the principles of the present invention. Accordingly, it is to be distinctly understood that the foregoing descriptive matter is to be interpreted merely as illustrative of the present invention and not as a limitation.

Having thus described the invention, it is claimed:
1. A drill tool comprising:
a tool support having an axis and coaxial mounting and body portions, said body portion extending from said mounting portion and having an outer end including a pair of end faces;
a pair of diametrically opposed channels defined by said body portion and extending from said end faces towards said mounting portion;
each channel including corresponding first and second walls extending radially of said axis and axially of said body portion;
each of said first and second walls of said channels having radially inner and outer linear edges extending from said outer end toward said mounting portion and parallel to said axis;
a pair of diametrically opposed third walls defined by said body portion and extending axially thereof, each of said third walls extending respectively between said radially inner edges of the corresponding first and second walls;
a passageway within said body portion and coaxial with said axis;
a drill bit mounted within said passageway and including a tip end extending beyond said end faces;
means for releasably engaging said drill bit in said passageway against rotation relative to said body portion;
means including a recess in said first wall of each of said channels for removably supporting a pair of cutter blades at said outer end of said body portion;
a cutter blade mounted within each of said recesses, said cutter blades each having a polygonal shape and a plurality of cutting edges;
said recesses each including shoulder means interengaging with the corresponding one of said cutter blades to axially position one of the cutting edge thereof forwardly adjacent to the corresponding one of said end faces;
said cutter blades and said shoulder means including cooperating surfaces allowing said cutter blades to be indexable thereon so that any one of said cutting edges may be projected forwardly with respect to said end face;

a portion of said cutter blades extending within the outside diameter of said drill bit;

a pair of relief surfaces defined in said body portion, each inclined with respect to said axis and intersecting one of said end faces and said second and third walls of said corresponding channel; and a pair of lubricant passages extending through said body portion and having respective outlets at said respective end faces.

2. A drill tool as defined in claim 1 wherein the outside diameter of said drill tool as defined by the cutting edges of said cutter blades is about four times the outside diameter of said drill bit.

3. A drill tool as defined in claim 1 wherein said drill bit includes helical flutes.

4. A drill tool as defined in claim 1 wherein said relief surfaces intersect a peripheral wall of said passageway.

5. A drill tool as defined in claims 1 or 4 wherein each of said relief surfaces has an inner end merging with the first wall of said corresponding channel along said radially inner edge of said first wall.

6. A drill tool as defined in claims 1 or 4 wherein each said relief surface intersects said end face of said corresponding channel along a line through a corresponding one of said outlets of said lubricant passages.

7. A drill tool as defined in claims 1 or 4 wherein said shoulder means includes a first shoulder spaced axially inwardly from said corresponding end face and extending radially outwardly along the first wall of the corresponding channel from a point adjacent the radially inner edge of said first wall, and a second shoulder extending from said point and converging with respect to said axis in the direction from said point toward said corresponding end face.

8. A tool support as defined in claim 7, wherein said second shoulder intersects said peripheral wall of said passageway between said point and said corresponding end face.

9. A tool support as defined in claim 1 wherein said shoulder means includes first and second shoulders defining a V-shaped notch, said second shoulder intersecting the walls of said body portion defining said passageway.

* * * * *